United States Patent
Calvin et al.

(10) Patent No.: US 10,550,036 B2
(45) Date of Patent: *Feb. 4, 2020

(54) LIGHTWEIGHT CONCRETE FORMULATIONS

(71) Applicant: 2581776 Ontario Inc., Etobicoke (CA)

(72) Inventors: Chris Calvin, Bradford (CA); Matthew Boehler, Markham (CA)

(73) Assignee: 2581776 ONTARIO INC., Etobicoke, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/148,456

(22) Filed: Oct. 1, 2018

(65) Prior Publication Data

US 2019/0031562 A1    Jan. 31, 2019

Related U.S. Application Data

(63) Continuation of application No. 15/821,141, filed on Nov. 22, 2017, now Pat. No. 10,087,105, which is a continuation of application No. PCT/CA2017/000130, filed on May 23, 2017.

(60) Provisional application No. 62/340,801, filed on May 24, 2016.

(51) Int. Cl.
| | |
|---|---|
| *C04B 18/02* | (2006.01) |
| *C04B 28/04* | (2006.01) |
| *C04B 14/24* | (2006.01) |
| *C04B 14/06* | (2006.01) |
| *C04B 14/10* | (2006.01) |
| *C04B 103/60* | (2006.01) |
| *C04B 111/00* | (2006.01) |
| *C04B 111/40* | (2006.01) |
| *C04B 111/20* | (2006.01) |
| *C04B 111/70* | (2006.01) |

(52) U.S. Cl.
CPC .......... *C04B 18/027* (2013.01); *C04B 14/06* (2013.01); *C04B 14/106* (2013.01); *C04B 14/24* (2013.01); *C04B 28/04* (2013.01); *C04B 2103/603* (2013.01); *C04B 2111/00155* (2013.01); *C04B 2111/2023* (2013.01); *C04B 2111/40* (2013.01); *C04B 2111/70* (2013.01)

(58) Field of Classification Search
CPC ....... C04B 14/06; C04B 14/24; C04B 14/106; C04B 18/027; C04B 28/04; C04B 2103/603; C04B 2111/00155; C04B 2111/40; C04B 2111/70; C04B 2111/2023
See application file for complete search history.

(56) References Cited

U.S. PATENT DOCUMENTS

| | | | |
|---|---|---|---|
| 4,002,482 A | 1/1977 | Coenen | |
| 4,013,478 A | 3/1977 | Meyer | |
| 4,115,135 A | 9/1978 | Goeman | |
| 5,292,467 A | 3/1994 | Mandish et al. | |
| 5,803,960 A | 9/1998 | Baxter | |
| 5,916,361 A | 6/1999 | Molloy et al. | |
| 6,344,081 B1 | 2/2002 | Pelot et al. | |
| 6,616,752 B1 | 9/2003 | Basura et al. | |
| 6,699,321 B2 | 3/2004 | Perlot et al. | |
| 6,743,287 B2 | 6/2004 | Sunde | |
| 7,174,962 B1 | 2/2007 | Roddy et al. | |
| 7,226,662 B2 | 6/2007 | Marohn | |
| 7,771,529 B1* | 8/2010 | McPherson | C04B 14/22 106/716 |
| 8,303,708 B2 | 11/2012 | Rigaud et al. | |
| 8,480,802 B2* | 7/2013 | McPherson | C04B 14/22 106/716 |
| 8,545,620 B2 | 10/2013 | Frenkenberger et al. | |
| 2004/0187740 A1 | 9/2004 | Timmons | |
| 2006/0000172 A1 | 1/2006 | Sumrall | |
| 2013/0098271 A1 | 4/2013 | Eberwein et al. | |
| 2013/0145968 A1 | 6/2013 | Scanlan | |
| 2015/0102540 A1 | 4/2015 | Shah et al. | |
| 2016/0039716 A1* | 2/2016 | Tagnit-Hamou | B28B 11/24 524/5 |

(Continued)

FOREIGN PATENT DOCUMENTS

| | | |
|---|---|---|
| WO | 92/19294 A1 | 9/1994 |
| WO | 94/19294 A1 | 9/1994 |
| WO | 2012/023825 A2 | 2/2012 |

OTHER PUBLICATIONS

Cota, F. P. et al., "Mechanical properties and ASR evaluation of concrete tiles with waste glass aggregate" Sustainable Cities and Society 2015, 16, pp. 49-56.

(Continued)

*Primary Examiner* — Anthony J Green
(74) *Attorney, Agent, or Firm* — Kagan Binder, PLLC

(57) ABSTRACT

A lightweight concrete formulation containing Portland cement, aggregate, glass particles, water and metakaolin. At least 80% of the glass particles have a grain size of less than 2 mm. The glass particles contribute between 3% and 20% of the total weight of the concrete formulation. The metakaolin contributes between 4% and 12% of the total weight of the concrete formulation. The glass particles are preferably expanded glass particles. Also provided is a lightweight grout formulation containing Portland cement, glass particles, water and metakaolin. At least 80% of the glass particles have a grain size of less than 2 mm. The glass particles contribute between 3% and 15% of the total weight of the grout formulation. The metakaolin contributes between 7% and 15% of the total weight of the grout formulation.

20 Claims, No Drawings

(56) References Cited

U.S. PATENT DOCUMENTS

2016/0244366 A1   8/2016   Turcinskas et al.

OTHER PUBLICATIONS

Panzera, T. H. et al., "Recycled glass as potential aggregate for concrete tiles: a statistical analysis of the physical and engineering properties" International Journal Environmental and Waste Management 2013, 12(3), pp. 280-299.

Metapor™ by Dennert. Datasheet [online] Dennert Poraver GmbH, published Sep. 2015, pp. 1-2 [retrieved on Jul. 11, 2017 (Jul. 11, 2017)]. Retrieved from <https://poraver.com/en/metapor/>.

Meyer, C. et al., "Concrete with Waste Glass as Aggregate" in "Recycling and Re-use of Glass Cullet", Dhir, Dyer and Limbachiya, editors, Proceedings of the International Symposium Concrete Technology Unit of ASCE and University of Dundee, Mar. 19-20, 2001, pp. 1-9.

Taha, B. et al., "Properties of concrete contains mixed colour waste recycled glass as sand and cement replacement", Construction and Building Materials 22, 2008, pp. 713-720.

PCT/CA2017/000130, Notification of Transmittal of the International Search Report The Written Opinion of the International Searching Authority, dated Aug. 9, 2017, 8 pp.

\* cited by examiner

LIGHTWEIGHT CONCRETE FORMULATIONS

PRIORITY CLAIM

This application is a continuation application of U.S. Ser. No. 15/821,141, filed Nov. 22, 2017, now U.S. Pat. No. 10,087,105, which is a continuation of International Application No. PCT/CA2017/000130, filed May 23, 2017, which in turn claims priority to U.S. Provisional Patent Application having Ser. No. 62/340,801, filed on May 24, 2016, all of which are incorporated herein by reference in their entireties for all purposes

FIELD OF THE INVENTION

The present invention relates generally to concrete formulations, and more particularly to lightweight concrete formulations containing glass.

BACKGROUND OF THE INVENTION

People have tried for several decades to use glass as a component of concrete. However, no such formulations have found significant commercial success even though many combinations of components in various proportions have been made and tested. One issue is that the Alkali Silica Reaction (ASR) causes concrete containing glass to deteriorate over time unless suitable measures are taken to reduce the effect of ASR. While many such measures have been proposed, formulations that are ASR-resistant while still providing high compressive strength have not been disclosed or commercially exploited.

SUMMARY OF THE INVENTION

The invention provides a lightweight concrete formulation containing Portland cement, aggregate, glass particles, water and metakaolin. At least 80% of the glass particles preferably have a grain size of less than 2 mm. The glass particles contribute between 3% and 20% of the total weight of the concrete formulation. The metakaolin contributes between 4% and 12% of the total weight of the concrete formulation. The glass particles are preferably expanded glass particles.

Preferably at least 80% of the glass particles have a grain size of 1 mm or less. More preferably, at least 80% of the glass particles have a grain size of 0.5 mm or less. At least 80% of the glass particles may have a grain size of 0.25 mm or greater.

The glass particles contribute between 6% and 15% of the total weight of the concrete formulation. The glass particles may contribute at least 12% of the total weight of the concrete formulation.

The metakaolin may contribute between 6% and 12% of the total weight of the concrete formulation, or preferably between 8% and 10% of the total weight of the concrete formulation.

The glass particles may contribute between 12% and 15% of the total weight of the concrete formulation.

The Portland cement may contribute between 30% and 38% of the total weight of the concrete formulation, where the aggregate contributes between 16% and 24% of the total weight of the concrete formulation, and the metakaolin contributes between 6% and 12% of the total weight of the concrete formulation.

The Portland cement may contribute between 32% and 36% of the total weight of the concrete formulation, where the aggregate contributes between 19% and 23% of the total weight of the concrete formulation, and the metakaolin contributes between 8% and 10% of the total weight of the concrete formulation.

The concrete formulation may also include sand. The Portland cement may contribute between 20% and 35% of the total weight of the concrete formulation where the aggregate contributes between 16% and 24% of the total weight of the concrete formulation, the sand contributes between 22% and 32% of the total weight of the concrete formulation, the glass particles contribute between 3% and 9% of the total weight of the concrete formulation, and the metakaolin contributes between 5% and 11% of the total weight of the concrete formulation. The Portland cement may contribute between 21% and 25% of the total weight of the concrete formulation where the aggregate contributes between 18% and 22% of the total weight of the concrete formulation, the sand contributes between 25% and 29% of the total weight of the concrete formulation, the glass particles contribute between 5% and 7% of the total weight of the concrete formulation, and the metakaolin contributes between 6% and 8% of the total weight of the concrete formulation.

The metakaolin is preferably Metapor®.

The invention also provides a lightweight grout formulation containing Portland cement, glass particles, water and metakaolin. At least 80% of the glass particles preferably have a grain size of less than 2 mm. The glass particles contribute between 3% and 15% of the total weight of the grout formulation. The metakaolin contributes between 6% and 15% of the total weight of the grout formulation. The glass particles are preferably expanded glass particles. Preferably at least 80% of the glass particles have a grain size of 1 mm or less. More preferably, at least 80% of the glass particles have a grain size of 0.5 mm or less. At least 80% of the glass particles may have a grain size of 0.25 mm or greater.

The glass particles may contribute between 6% and 15% of the total weight of the grout formulation. The glass particles may contribute between 8% and 13% of the total weight of the grout formulation.

The metakaolin may contribute between 8% and 13% of the total weight of the grout formulation.

The glass particles may contribute between 8.5% and 10.5% of the total weight of the grout formulation.

The Portland cement may contribute between 44% and 52% of the total weight of the grout formulation, and the metakaolin may contribute between 8% and 13% of the total weight of the grout formulation.

The Portland cement may contribute between 45.5% and 49.5% of the total weight of the8grout formulation, and the metakaolin may contribute between 9.5% and 11.5% of the total weight of the grout formulation.

The grout formulation may also include sand. The Portland cement may contribute between 32% and 37% of the total weight of the grout formulation, the sand may contribute between 20% and 28% of the total weight of the grout formulation, the glass particles may contribute between 3% and 9% of the total weight of the grout formulation, and the metakaolin may contribute between 8% and 14% of the total weight of the grout formulation. The Portland cement may contribute between 33.5% and 35.5% of the total weight of the grout formulation, the sand may contribute between 22% and 24% of the total weight of the grout formulation, the glass particles may contribute between 5% and 7% of the total weight of the grout formulation, and the metakaolin may contribute between 9% and 11% of the total weight of the grout formulation.

In the grout formulations the metakaolin is preferably Metapor®.

DETAILED DESCRIPTION OF THE INVENTION

The invention provides formulations, or mixes, of shotcrete and grout that provide excellent compressive strength and ASR resistance.

A preferred mix design for a conventional form of concrete for use as shotcrete is shown below. The amounts shown are designed to produce a cubic metre of shotcrete.

| Component | Weight (kg) | Weight % |
| --- | --- | --- |
| Portland cement | 449 | 19.4% |
| Aggregate | 430 | 18.6% |
| Sand | 1263 | 54.7% |
| Water | 169 | 7.3% |
| Total | 2311 | 100% |

In preferred lightweight shotcrete mixes, some or all of the sand may be replaced with glass. For example, in one mix, half of the sand (631.5 kg) in the above standard mix may be replaced by 158 kg of glass. The preferred form of glass is expanded glass particles having grain sizes less than 4 mm (ASTM C135 mesh no. 5 or less), preferably less than 2 mm (ASTM C135 mesh no. 10 or less) or 1 mm (ASTM C135 mesh no. 18 or less) and most preferably less than 0.5 mm (ASTM C135 mesh no. 35 or less) or less than 0.3 mm (ASTM C135 mesh no. 50 or less). Such glass particles may be made from recycled glass that is finely ground, mixed and formed to granules, which are sintered and expanded in a rotary kiln. This process creates lightweight spheres with a fine closed cellular pore structure. A preferred product is Poraver® expanded glass beads with grain sizes from 0.04 mm to 4 mm. The preferred Poraver product has a grain size of 0.25-0.5 mm, mesh no. 60-35 and a fineness modulus of about 1.92. Alternatively, a Poraver product having a grain size or 0.1-0.3 mm, mesh no. 140-50 and a fineness modulus of about 0.66 may be used. These products have 10% or less oversize particles and 15% or less undersize particles. Generally herein when referring to a maximum particle grain size, it is meant that at least 80% of the particles do not have a larger grain size and preferably at least 90% of the particles do not have a larger grain size. Most preferably 100% of the particles do not have a larger grain size.

The use of such fine expanded glass particles reduces ASR so that ASR-related damage is less likely to occur.

In preferred mixes, a strengthening/hardening and stabilizing agent is also added. The preferred agent is metakaolin, a dehydroxylated form of the clay mineral kaolinite. Metakaolin further reduces the deterioration of concrete by ASR. Metakaolin is a pozzolan. Testing has shown that the use of metakaolin provides better results than other pozzolans that have been tried. Metakaolin is added to contribute about 4% to 15% of the weight of a mix, or more preferably 4% to 12%, 6% to 10% or 8% to 12%. A preferred form of metakaolin is Metapor®, which is metakaolin with small amounts of fine expanded glass produced by Poraver as a byproduct of the production of expanded glass beads. As such, Metapor is relatively inexpensive.

Two preferred shotcrete mixes are shown below.

|  | Shotcrete Mix 1 | | Shotcrete Mix 2 | |
| --- | --- | --- | --- | --- |
| Component | Weight (kg) | Weight % | Weight (kg) | Weight % |
| Portland cement | 10.5 | 35.1% | 8.75 | 27.0% |
| Aggregate | 5.6 | 18.7% | 5.5 | 16.9% |
| Sand | 0 | 0 | 8.0 | 24.7% |
| Glass | 4.0 | 13.4% | 2.0 | 6.2% |
| Water | 7.4 | 24.7% | 6.0 | 18.5% |
| Metapor | 2.4 | 8.0% | 2.2 | 6.8% |
| Total | 29.9 | 100% | 32.45 | 100% |

A mix similar to Shotcrete Mix 1 was tested for compressive strength starting on May 5, 2016 according to the standard CSA A23.2-3C and -9C. Six cylinders were formed with an average density of 1561 kg/m$^3$ with a standard deviation of 6.7 kg/m$^3$. The shotcrete temperature was 18° C. and the air temperature was 15° C. The initial 24 hour curing temperature was between 20° C. and 25° C. The compressive strength was measured as 21.6 MPa (2 days), 23.2 MPa (5 days), and 23.3 MPa (7 days).

Shotcrete Mix 2 was tested for compressive strength starting on May 5, 2016 according to the standard CSA A23.2-3C and -9C. Six cylinders were formed with an average density of 1913 kg/m$^3$ with a standard deviation of 7.0 kg/m$^3$. The shotcrete temperature was 16.5° C. and the air temperature was 15° C. The initial 24 hour curing temperature was between 20° C. and 25° C. The compressive strength was measured as 24.8 MPa (2 days), 26.3 MPa (5 days), and 28.4 MPa (7 days).

Experimentation and testing has shown that Shotcrete Mix 1 and Shotcrete Mix 2 produce concrete with high compressive strength relative to other concrete formulations containing glass, and it is believed that the formulation using ASR-resistant expanded glass in combination with metakaolin, preferably in the form of Metapor®, in the proportions disclosed herein will reduce or prevent ASR-related damage. Several other mixes using different amounts of glass particles and Metapor and other components were made and tested. In several cases where 50% of the sand was replaced by glass, as in Shotcrete Mix 2, such other mixes produced concrete with compression strengths below 20 MPa. When using no sand, as in Shotcrete Mix 1, some such other mixes produced concrete with compression strengths below 10 MPa.

Two additional preferred shotcrete mixes are shown below.

|  | Shotcrete Mix 3 | | Shotcrete Mix 4 | |
| --- | --- | --- | --- | --- |
| Component | Weight (kg) | Weight % | Weight (kg) | Weight % |
| Portland cement | 680 | 33.6% | 464 | 22.4% |
| Aggregate | 420 | 20.8% | 420 | 20.3% |
| Sand |  |  | 550 | 26.6% |
| Glass | 270 | 13.4% | 137.5 | 6.6% |
| Water | 461 | 22.8% | 326.5 | 15.8% |
| Metapor | 190 | 9.4% | 170 | 8.2% |
| Total | 2021 |  | 2068 |  |

Weights and weight percentages of glass as used herein are for dry glass. The glass does in fact absorb some of the water. For example, in shotcrete mix 3, about 100 kg of the water is typically absorbed by the glass. In general, in all mixes discussed herein, the amount of water required will vary based on various factors, such as the environment (e.g. the relative humidity) and the water content of the sand in mixes employing sand.

Shotcrete Mix 3 was tested for compressive strength starting on Dec. 14, 2016 by exp Services Inc. of Brampton, Ontario, Canada. The shotcrete temperature was 16° C. and the air temperature was −2° C. with a relative humidity of 8.5%. 101.5 mm diameter cylinders were tested. The following results were measured.

| Duration (days) | Mass (kg/m$^3$) | Strength (MPa) |
|---|---|---|
| 1 | 1662 | 23.7 |
| 1 | 1656 | 23.3 |
| 3 | 1644 | 27.8 |
| 3 | 1662 | 27.8 |
| 7 | 1644 | 37.5 |
| 7 | 1656 | 28.4 |
| 7 | 1668 | 37.0 |
| 7 | 1662 | 28.9 |
| 28 | 1650 | 32.5 |
| 28 | 1662 | 30.1 |

Shotcrete Mix 4 was tested for compressive strength starting on Feb. 16, 2017 by exp Services Inc. of Brampton, Ontario, Canada. The shotcrete temperature was 21.5° C. and the air temperature was 20° C. with a relative humidity of 8.0%. 101.5 mm diameter cylinders were tested. The following results were measured.

| Duration (days) | Mass (kg/m$^3$) | Strength (MPa) |
|---|---|---|
| 1 | 1826 | 0.2 |
| 1 | 1851 | 10.8 |
| 1 | 1826 | 10.9 |
| 3 | 1845 | 26.3 |
| 3 | 1826 | 26.7 |
| 6 | 1851 | 32.7 |
| 6 | 1833 | 34.0 |
| 7 | 1826 | 32.2 |
| 7 | 1833 | 33.0 |

In general, a water/cement ratio of 0.35 to 0.45 is preferred. The water/cement ratio is calculated as the amount of water, excluding the water absorbed by the glass, divided by the sum of the amount of Portland and metapor. So for Shotcrete Mix 3, for example, the water cement ratio is 0.41.

A preferred mix design for a conventional form of grout is shown below. The amounts shown are designed to produce a cubic metre of grout.

| Component | Weight (kg) | Weight % |
|---|---|---|
| Portland cement | 872 | 38.2% |
| Sand | 1172 | 51.4% |
| Water | 238 | 10.4% |
| Total | 2282 | 100% |

In preferred lightweight grout mixes, some or all of the sand may be replaced with glass. For example, in one mix, half of the sand (586 kg) in the above standard mix may be replaced by 146.5 kg of glass. The preferred form of glass is expanded glass particles having grain sizes as described above with respect to shotcrete.

In preferred mixes, metakaolin, a strengthening/hardening and stabilizing agent as discussed above, is also added. Metakaolin is added to contribute about 7% to 15% of the weight of a mix, or more preferably 9% to 13%, or most preferably about 10% to 12%.

Two examples of preferred grout mixes are shown below.

| | Grout Mix 1 | | Grout Mix 2 | |
|---|---|---|---|---|
| Component | Weight (kg) | Weight % | Weight (kg) | Weight % |
| Portland cement | 12.3 | 51.7% | 8.2 | 35.50% |
| Sand | 0 | | 5.5 | 23.80% |
| Glass | 2.5 | 10.5% | 1.4 | 6.10% |
| Water | 6.5 | 27.3% | 5.5 | 23.80% |
| Metapor | 2.5 | 10.5% | 2.5 | 10.80% |
| Total | 23.8 | 100% | 23.1 | 100% |

Grout Mix 1 was tested for compressive strength starting on May 5, 2016 according to the standard CSA A23.2-3C and -9C. Six cubes were formed with an average density of 1595 kg/m$^3$ with a standard deviation of 33.9 kg/m$^3$. The grout temperature was 22° C. and the air temperature was 14° C. The initial 24 hour curing temperature was between 18° C. and 20° C. The compressive strengths measured were 25.0 MPa (2 days), 39.1 MPa (5 days), and 45.2 MPa (7 days).

Grout Mix 2 was tested for compressive strength starting on May 5, 2016 according to the standard CSA A23.2-3C and -9C. Six cubes were formed with an average density of 1735 kg/m$^3$ with a standard deviation of 40.9 kg/m$^3$. The grout temperature was 19° C. and the air temperature was 14° C. The initial 24 hour curing temperature was between 18° C. and 20° C. The compressive strengths measured were 28.2 MPa (2 days), 45.9 MPa (5 days), 48.8 MPa (7 days) and 49.2 MPa (7 days).

Experimentation and testing has shown that Grout Mix 1 and Grout Mix 2 produce concrete with high compressive strength relative to other concrete formulations containing glass, and it is believed that the formulation using ASR-resistant expanded glass in combination with metakaolin, preferably in the form of Metapor®, will reduce or prevent ASR-related damage. Several other mixes using different amounts of glass particles and Metapor and other components were made and tested. In several cases where 50% of the sand was replaced by glass, as in Grout Mix 2, such other mixes produced grout with compression strengths below 30 MPa. When using no sand, as in Grout Mix 1, some such other mixes produced concrete with compression strengths below 30 MPa, with some even below 10 MPa.

Two additional examples of preferred grout mixes are shown below.

| Component | Grout Mix 3 Weight % | Grout Mix 4 Weight % |
|---|---|---|
| Portland cement | 47.5% | 34.4% |
| Sand | 0.0% | 23.1% |
| Glass | 9.5% | 5.7% |
| Water | 33.5% | 26.5% |
| Metapor | 9.5% | 10.2% |
| Total | 100% | 100% |

Grout Mix 3 was tested for compressive strength starting on Mar. 15, 2017 by exp Services Inc. of Brampton, Ontario, Canada. The grout temperature was 20.4° C. and the air temperature was 20.9° C. 50 mm cubes were tested. The following results were measured.

| Duration (days) | Grout Mix 3 Strength (MPa) |
|---|---|
| 2 | 27.6 |
| 2 | 24.4 |
| 2 | 25.6 |
| 7 | 46.2 |
| 7 | 50.8 |
| 7 | 50.0 |

Grout Mix 4 was tested for compressive strength starting on Mar. 15, 2017 by exp Services Inc. of Brampton, Ontario, Canada. The grout temperature was 20.1° C. and the air temperature was 21.2° C. 50 mm cubes were tested. The following results were measured.

| Duration (days) | Grout Mix 4 Strength (MPa) |
|---|---|
| 2 | 20.6 |
| 2 | 23.3 |
| 2 | 22.3 |
| 7 | 43.0 |
| 7 | 43.9 |
| 7 | 44.8 |

Linear shrinkage tests were also performed by exp Services Inc. of Brampton, Ontario, Canada. The mix had a slump of 180 mm, air content of 8.4% and concrete temperature of 20.7° C. The test mix employed 13.6 kg of cement, 3.8 kg of metapor, 5.4 kg of glass, and 7.2 kg of water. Three prisms were tested with the following results.

| Prism | 7 day dry shrinkage | 14 day dry shrinkage | 21 day dry shrinkage | 28 day dry shrinkage |
|---|---|---|---|---|
| A | 0.010% | 0.009% | 0.022% | 0.033% |
| B | 0.010% | 0.008% | 0.022% | 0.032% |
| C | 0.010% | 0.008% | 0.021% | 0.032% |
| Mean | 0.010% | 0.008% | 0.022% | 0.032% |

As would be evident to skilled persons, the shrinkage results would have been even better if the material had a maximum of a 100 mm slump. Anything under 0.040% is considered to be acceptable.

An accelerated mortar bar expansion test was performed on three mortar bars (also referred to as prisms) using test method LS-620 or CSA A23.2-25A, with 80° C. NaOH curing. The accelerated mortar bar expansion test provides a measure of the resistance of the material to damage due to the Alkali Silica Reaction (ASR). The mortar bars were formed incorporating metapor and Poraver expanded glass beads with grain size of 0.25-0.5 mm, mesh no. 60-35 and a fineness modulus of about 1.92. The following average expansions were measured: 0.009% (3 days), 0.012% (7 days), 0.020% (10 days) and 0.038% (14 days). This compares favorably with the maximum allowable limit of 0.150%. In contrast, a mortar bar of reference material was also tested and an expansion of 0.429% was measured, which was consistent with expectations for the reference material.

In addition a cylinder was cut, prepared and tested according to ASTM designation C1202 "Electrical Indication of Concrete's Ability to Resist Chloride Ion Penetration". The results showed 1765 Coulombs of charged passed in a test on day 8, and 694 Coulombs of charged passed in a test on day 28. Anything under about 2500 Coulombs at day 28 is considered acceptable.

In this document, references to "mix", "formulation" and "composition" mean the same thing, and refer to a particular mixture of component ingredients.

The abbreviation mm as used herein refers to millimetres (or in the US, "millimeters"). The abbreviation m as used herein refers to metres (or in the US, "meters"). The abbreviation kg as used herein refers to kilograms. The abbreviation MPa as used herein refers to megapascals.

It should be understood that the above-described embodiments of the present invention, particularly, any "preferred" embodiments, are only examples of implementations, merely set forth for a clear understanding of the principles of the invention. Many variations and modifications may be made to the above-described embodiment(s) of the invention as will be evident to those skilled in the art. That is, persons skilled in the art will appreciate and understand that such modifications and variations are, or will be, possible to utilize and carry out the teachings of the invention described herein.

Where, in this document, a list of one or more items is prefaced by the expression "such as" or "including", is followed by the abbreviation "etc.", or is prefaced or followed by the expression "for example", or "e.g.", this is done to expressly convey and emphasize that the list is not exhaustive, irrespective of the length of the list. The absence of such an expression, or another similar expression, is in no way intended to imply that a list is exhaustive. Unless otherwise expressly stated or clearly implied, such lists shall be read to include all comparable or equivalent variations of the listed item(s), and alternatives to the item(s), in the list that a skilled person would understand would be suitable for the purpose that the one or more items are listed.

The words "comprises" and "comprising", when used in this specification and the claims, are used to specify the presence of stated features, elements, integers, steps or components, and do not preclude, nor imply the necessity for, the presence or addition of one or more other features, elements, integers, steps, components or groups thereof.

The scope of the claims that follow is not limited by the embodiments set forth in the description. The claims should be given the broadest purposive construction consistent with the description and figures as a whole.

What is claimed is:

1. A concrete formulation comprising Portland cement, aggregate, expanded glass particles, water and metakaolin, wherein at least 80% of the expanded glass particles have a grain size of less than 2 mm, the expanded glass particles contribute between 3% and 20% of the total weight of the concrete formulation, and the metakaolin contributes between 5% and 15% of the total weight of the concrete formulation, and wherein the compressive strength of the concrete formulation is at least 24 MPa after curing.

2. The concrete formulation of claim 1, wherein at least 80% of the expanded glass particles have a grain size of between 0.25 mm and 0.5 mm.

3. The concrete formulation of claim 1, wherein the expanded glass particles contribute between 6% and 15% of the total weight of the concrete formulation.

4. The concrete formulation of claim 1, wherein the expanded glass particles contribute at least 12% of the total weight of the concrete formulation.

5. The concrete formulation of claim 1, wherein the metakaolin contributes between 8% and 12% of the total weight of the concrete formulation.

6. The concrete formulation of claim 1, wherein the expanded glass particles contribute between 12% and 15% of the total weight of the concrete formulation.

7. The concrete formulation of claim 1, wherein the Portland cement contributes between 30% and 38% of the total weight of the concrete formulation, the aggregate contributes between 16% and 24% of the total weight of the concrete formulation, and the metakaolin contributes between 6% and 12% of the total weight of the concrete formulation.

8. The concrete formulation of claim 1, wherein the Portland cement contributes between 32% and 36% of the total weight of the concrete formulation, the aggregate contributes between 19% and 23% of the total weight of the concrete formulation, and the metakaolin contributes between 8% and 10% of the total weight of the concrete formulation.

9. A concrete formulation comprising Portland cement, aggregate, expanded glass particles, sand, water and metakaolin, wherein at least 80% of the expanded glass particles have a grain size of less than 2 mm, the expanded glass particles contribute between 3% and 20% of the total weight of the concrete formulation, and the metakaolin contributes between 5% and 15% of the total weight of the concrete formulation, and wherein the compressive strength of the concrete formulation is at least 24 MPa after curing.

10. The concrete formulation of claim 9, wherein the Portland cement contributes between 20% and 35% of the total weight of the concrete formulation, the aggregate contributes between 16% and 24% of the total weight of the concrete formulation, the sand contributes between 22% and 32% of the total weight of the concrete formulation, the expanded glass particles contribute between 3% and 9% of the total weight of the concrete formulation, and the metakaolin contributes between 5% and 11% of the total weight of the concrete formulation.

11. The concrete formulation of claim 10, wherein the Portland cement contributes between 21% and 25% of the total weight of the concrete formulation, the aggregate contributes between 18% and 22% of the total weight of the concrete formulation, the sand contributes between 25% and 29% of the total weight of the concrete formulation, the expanded glass particles contribute between 5% and 7% of the total weight of the concrete formulation, and the metakaolin contributes between 6% and 8% of the total weight of the concrete formulation.

12. A grout formulation comprising Portland cement, expanded glass particles, water and metakaolin, wherein at least 80% of the expanded glass particles have a grain size of less than 2 mm, the expanded glass particles contribute between 3% and 15% of the total weight of the grout formulation, and the metakaolin contributes between 5% and 15% of the total weight of the grout formulation, and wherein the compressive strength of the grout formulation is at least 24 MPa after curing.

13. The grout formulation of claim 12, wherein at least 80% of the expanded glass particles have a grain size of between 0.25 mm and 0.5 mm.

14. The grout formulation of claim 12, wherein the expanded glass particles contribute between 8% and 13% of the total weight of the grout formulation.

15. The grout formulation of claim 12, wherein the metakaolin contributes between 8% and 11% of the total weight of the grout formulation.

16. The grout formulation of claim 12, wherein the expanded glass particles contribute between 8.5% and 10.5% of the total weight of the grout formulation.

17. The grout formulation of claim 12, wherein the Portland cement contributes between 44% and 52% of the total weight of the grout formulation, and the metakaolin contributes between 8% and 13% of the total weight of the grout formulation.

18. The grout formulation of claim 12, wherein the Portland cement contributes between 45.5% and 49.5% of the total weight of the grout formulation, and the metakaolin contributes between 9.5% and 11.5% of the total weight of the grout formulation.

19. The grout formulation of claim 12 further comprising sand, wherein the Portland cement contributes between 32% and 37% of the total weight of the grout formulation, the sand contributes between 20% and 28% of the total weight of the grout formulation, the expanded glass particles contribute between 3% and 9% of the total weight of the grout formulation, and the metakaolin contributes between 8% and 14% of the total weight of the grout formulation.

20. The grout formulation of claim 12, wherein the Portland cement contributes between 33.5% and 35.5% of the total weight of the grout formulation, the sand contributes between 22% and 24% of the total weight of the grout formulation, the expanded glass particles contribute between 5% and 7% of the total weight of the grout formulation, and the metakaolin contributes between 9% and 11% of the total weight of the grout formulation.

* * * * *